United States Patent
Kim et al.

(10) Patent No.: US 12,354,289 B2
(45) Date of Patent: Jul. 8, 2025

(54) APPARATUS FOR GENERATING A DEPTH MAP OF A MONOCULAR CAMERA IMAGE AND A METHOD THEREOF

(71) Applicants: HYUNDAI MOTOR COMPANY, Seoul (KR); KIA CORPORATION, Seoul (KR)

(72) Inventors: Jin Sol Kim, Hwaseong-si (KR); Jin Ho Park, Seoul (KR); Jang Yoon Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 78 days.

(21) Appl. No.: 18/143,374

(22) Filed: May 4, 2023

(65) Prior Publication Data

US 2024/0233153 A1 Jul. 11, 2024

(30) Foreign Application Priority Data

Jan. 10, 2023 (KR) .......... 10-2023-0003616

(51) Int. Cl.
*G06T 7/521* (2017.01)
*G06T 5/70* (2024.01)
*G06T 7/11* (2017.01)

(52) U.S. Cl.
CPC ......... *G06T 7/521* (2017.01); *G06T 5/70* (2024.01); *G06T 7/11* (2017.01); *G06T 2207/10028* (2013.01); *G06T 2207/20081* (2013.01)

(58) Field of Classification Search
CPC . G06T 2207/10028; G06T 2207/20081; G06T 5/70; G06T 7/11; G06T 7/521
See application file for complete search history.

(56) References Cited

U.S. PATENT DOCUMENTS

| | | | |
|---|---|---|---|
| 10,699,430 B2 | 6/2020 | Chondro et al. | |
| 2018/0096463 A1* | 4/2018 | Kim | ............. G06T 13/40 |
| 2020/0111225 A1 | 4/2020 | Chondro et al. | |
| 2020/0160559 A1* | 5/2020 | Urtasun | ............. G06V 10/82 |
| 2020/0218979 A1 | 7/2020 | Kwon et al. | |
| 2021/0142497 A1* | 5/2021 | Pugh | ............. G06T 7/194 |
| 2021/0241435 A1 | 8/2021 | Zhou et al. | |
| 2022/0058817 A1* | 2/2022 | Vaquero Gomez | ..... G06T 7/593 |
| 2023/0177818 A1* | 6/2023 | Kaithakauzha | ....... G01S 7/4802 382/106 |

(Continued)

FOREIGN PATENT DOCUMENTS

CN 113409376 A 9/2021
JP 2020061114 A 4/2020
(Continued)

*Primary Examiner* — Mohamed A. Wasel
(74) *Attorney, Agent, or Firm* — Lempia Summerfield Katz LLC

(57) ABSTRACT

An apparatus and a method remove noise from a point cloud and generate a depth map of a monocular camera image. The apparatus includes a camera sensor that photographs a monocular camera image. The apparatus also includes a lidar sensor that generates the point cloud corresponding to the monocular camera image. The apparatus also includes a controller that removes noise from the point cloud and generates the depth map of the monocular camera image based on the point cloud from which the noise is removed.

16 Claims, 14 Drawing Sheets

(56) References Cited

U.S. PATENT DOCUMENTS

2024/0428466 A1* 12/2024 Ahn .................. G01S 17/89
2025/0014198 A1* 1/2025 Park .................. G06T 7/55

FOREIGN PATENT DOCUMENTS

| KR | 20100021952 A | 2/2010 |
| KR | 20210087524 A | 7/2021 |
| KR | 102310790 B1 | 10/2021 |

* cited by examiner

APPARATUS FOR GENERATING A DEPTH MAP OF A MONOCULAR CAMERA IMAGE AND A METHOD THEREOF

CROSS-REFERENCE TO RELATED APPLICATION

This application claims the benefit of priority to Korean Patent Application No. 10-2023-0003616, filed in the Korean Intellectual Property Office on Jan. 10, 2023, the entire contents of which are incorporated herein by reference.

TECHNICAL FIELD

The present disclosure relates to a technique for generating a depth map of a monocular camera image based on a light detection and ranging (lidar) point cloud.

BACKGROUND

In general, in a field of artificial intelligence, an artificial neural network (ANN) is an algorithm that simulates a human neural structure to allow a machine to learn. Recently, ANNs have been applied to image recognition, voice recognition, natural language processing, and the like and show excellent effects. An artificial neural network includes an input layer that receives an input, a hidden layer that learns, and an output layer that returns an operation result. An artificial neural network having multiple hidden layers is called a deep neural network (DNN), which is also a type of artificial neural network.

An artificial neural network enables a computer to learn based on data. What is required when trying to solve a problem using an artificial neural network is a suitable artificial neural network model and data to be analyzed. An artificial neural network model to solve a problem is learned based on data. Before training the model, it is necessary to properly process the data first. Standardized input and output data often lead to high accuracy of ANN models. Therefore, a process of preprocessing the acquired raw data to suit the requested input data is required. After the preprocessing is completed, the processed data is required to be divided into two types. The data is divided into a training dataset and a validation dataset. The training dataset is used to train a model and the validation dataset is used to verify the performance of the model.

There are various reasons for verifying an artificial neural network model. Artificial neural network developers tune the model by modifying the hyper-parameters of the model based on the validation results of the model. In addition, several models are verified to select which model is suitable among the models. The reasons why model verification is necessary are explained in more detail as follows.

The first reason is to predict accuracy. The purpose of an artificial neural network is to achieve good performance on out-of-sample data that are not used for learning as a result. Therefore, after making a model, it is necessary to check how well the model performs on out-of-sample data. However, because the model cannot be validated using the training dataset, the accuracy of the model must be measured using a validation dataset separate from the training dataset.

The second reason is to improve the performance of the model by tuning the model. For example, it is possible to prevent overfitting. Overfitting means that the model is over-trained on the training dataset. For example, when the training accuracy is high but the validation accuracy is low, it is possible to suspect that overfitting has occurred. In addition, it may be grasped in more detail through training loss and validation loss. When overfitting has occurred, overfitting should be prevented to increase verification accuracy. It is possible to prevent overfitting by using a scheme such as regularization or dropout.

A monocular depth estimation (MDE) model, which is a deep learning model for estimating a depth value for each pixel of an RGB image, may express the depth value as a color. For example, in the MDE model, a smaller depth value (a shallower depth based on camera coordinates) may be expressed in yellow. Also, a larger depth value (a deeper depth based on camera coordinates) may be expressed in blue.

In order to train such an MDE model, a monocular camera image having a depth map is required as training data. However, most monocular camera images contain noise for a depth map. Such monocular camera images include a monocular camera image in which pixels that should not have depth information (e.g., the sky) exist, a monocular camera image in which pixels constituting one object have different depth information, and a monocular camera image in which a single pixel has a plurality of depth information. As a result, learning of the MDE model based on such training data acts as a factor that degrades the performance of the MDE model.

Therefore, in order to improve the performance of the MDE model, it is necessary to generate a depth map having no noise.

The matters described in this background section are intended to promote an understanding of the background of the disclosure and may include matters that are not already known to those of ordinary skill in the art.

SUMMARY

The present disclosure has been made to solve the above-mentioned problems occurring in the prior art while advantages achieved by the prior art are maintained intact.

Aspects of the present disclosure provide an apparatus and a method for generating a depth map of a monocular camera image capable of constructing a learning database (DB) capable of improving the performance of a monocular depth estimation (MDE) model. The apparatus and method do so by obtaining a monocular camera image from a camera sensor, obtaining a point cloud corresponding to the monocular camera image from a light detection and ranging (lidar) sensor, removing noise from the point cloud, and generating a depth map of the monocular camera image based on the noise-removed point cloud.

Further aspects of the present disclosure provide an apparatus and a method for generating a depth map of a monocular camera image capable of allowing one object in a monocular camera image to have the same information. The apparatus and method do so by converting a point cloud of a lidar coordinate system into a point cloud of a camera coordinate system, maintaining only a point cloud that is visible from a camera viewpoint with respect to the point cloud of the camera coordinate system, and removing an actual invisible point cloud as noise.

Still other aspects of the present disclosure provide an apparatus and a method for generating a depth map of a monocular camera image capable of allowing a region that should not have depth information to have no depth information. The apparatus and method do so by converting the noise-removed point cloud of the camera coordinate system into a point cloud of the image coordinate system and deleting, as noise, a point cloud corresponding to a specific region (e.g., a sky region or a lidar blind spot) in the monocular camera image from the point cloud of the image coordinate system.

The technical problems to be solved by the present disclosure are not limited to the aforementioned problems. Any other technical problems not mentioned herein should be more clearly understood from the following description by those having ordinary skill in the art to which the present disclosure pertains.

According to an aspect of the present disclosure, an apparatus for generating a depth map of a monocular camera image includes: a camera sensor that photographs a monocular camera image; a lidar sensor that generates a point cloud corresponding to the monocular camera image; and a controller that removes noise from the point cloud and generates the depth map of the monocular camera image based on the point cloud from which the noise is removed.

According to an embodiment, the controller may convert a point cloud of a lidar coordinate system into a point cloud of a camera coordinate system.

According to an embodiment, the controller may maintain a point cloud that is visible from a camera viewpoint and remove a point cloud that is not visible from the camera viewpoint with respect to the point cloud of the camera coordinate system.

According to an embodiment, the controller may remove an occlusion point from the point cloud of the camera coordinate system based on a convex hull algorithm.

According to an embodiment, the controller may convert the noise-removed point cloud of the camera coordinate system into a point cloud of an image coordinate system.

According to an embodiment, the controller may delete a point cloud corresponding to a specific region within the monocular camera image from the point cloud of the image coordinate system.

According to an embodiment, the controller may detect the specific region in the monocular camera image by using a deep learning-based segmentation model. The specific region may include at least one of a sky region and a lidar blind spot.

According to another aspect of the present disclosure, a method of generating a depth map of a monocular camera image includes: photographing, by a camera sensor, the monocular camera image; generating, by a lidar sensor, a point cloud corresponding to the monocular camera image; removing, by a controller, noise from the point cloud; and generating, by the controller, the depth map of the monocular camera image based on the point cloud from which the noise is removed.

According to an embodiment, removing the noise may include converting a point cloud of a lidar coordinate system into a point cloud of a camera coordinate system.

According to an embodiment, removing the noise may include maintaining a point cloud that is actually visible from a camera viewpoint with respect to the point cloud of the camera coordinate system and removing a point cloud that is not actually visible from the camera viewpoint.

According to an embodiment, removing the noise may include removing an occlusion point from the point cloud of the camera coordinate system based on a convex hull algorithm.

According to an embodiment, removing the noise may include converting the noise-removed point cloud of the camera coordinate system into a point cloud of an image coordinate system.

According to an embodiment, removing the noise may include deleting a point cloud corresponding to a specific region within the monocular camera image from the point cloud of the image coordinate system.

According to an embodiment, deleting the point cloud may include detecting the specific region in the monocular camera image by using a deep learning-based segmentation model.

According to an embodiment, the specific region may include at least one of a sky region and a lidar blind spot.

BRIEF DESCRIPTION OF THE DRAWINGS

The above and other objects, features, and advantages of the present disclosure should be more apparent from the following detailed description taken in conjunction with the accompanying drawings in which.

DETAILED DESCRIPTION

Figure 1:
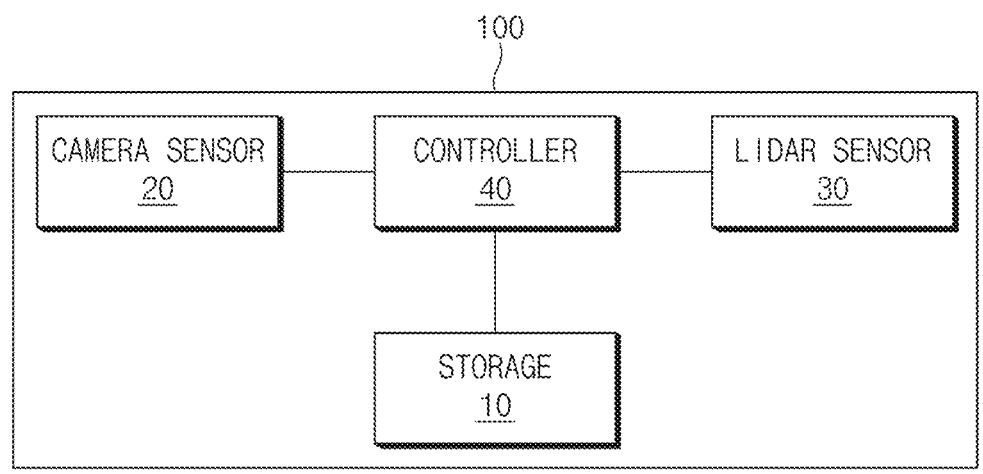
FIG. 1 is a block diagram of an apparatus for generating a depth map of a monocular camera image according to an embodiment of the present disclosure.

Hereinafter, some embodiments of the present disclosure are described in detail with reference to the accompanying drawings. In adding the reference numerals to the components of each drawing, it should be noted that identical or equivalent components are designated by the identical reference numerals even when they are displayed on other drawings. Further, in describing embodiments of the present disclosure, a detailed description of related known configurations or functions has been omitted where it has been determined that it would have interfered with the understanding of embodiments of the present disclosure.

In describing the components of embodiments according to the present disclosure, terms such as "first," "second," "A," "B," "(a)," "(b)," and the like may be used. These terms are merely intended to distinguish the components from other components, and the terms do not limit the nature, order, or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein.

When a component, device, element, or the like of the present disclosure is described as having a purpose or performing an operation, function, or the like, the component, device, or element should be considered herein as being "configured to" meet that purpose or to perform that operation or function.

FIG. 1 is a block diagram of an apparatus for generating a depth map of a monocular camera image according to an embodiment of the present disclosure.

As shown in FIG. 1, an apparatus 100 for generating a depth map of a monocular camera image according to an embodiment of the present disclosure may include storage 10, a camera sensor 20, a light detection and ranging (lidar) sensor 30, and a controller 40. Depending on a scheme of implementing the apparatus 100 for generating a depth map of a monocular camera image according to an embodiment of the present disclosure, components may be combined with each other to be implemented as one, or some components may be omitted.

Regarding each component, the storage 10 may store various logic, algorithms, and programs required in the processes of obtaining a monocular camera image from the camera sensor 20, obtaining a point cloud corresponding to the monocular camera image from the lidar sensor 30, removing noise from the point cloud, and generating the depth map of the monocular camera image based on the noise-removed point cloud.

The storage 10 may store various logic, algorithms, and programs required in the processes of converting the point cloud of the lidar coordinate system into the point cloud of the camera coordinate system, maintaining only a point cloud that is actually visible from the camera viewpoint with respect to the point cloud of the camera coordinate system, and removing an actual invisible point cloud as noise.

The storage 10 may store a convex hull algorithm capable of removing an occlusion point from the point cloud of the camera coordinate system.

The storage 10 may store various logic, algorithms and programs required in the processes of converting the noise-removed point cloud of the camera coordinate system into a point cloud of the image coordinate system, and deleting, as noise, a point cloud corresponding to a specific region (e.g., a sky region or a lidar blind spot) in the monocular camera image from the point cloud of the image coordinate system.

The storage 10 may store a segmentation model capable of detecting a specific area (e.g., a sky region or a lidar blind spot) in the monocular camera image.

The storage 10 may store a deep learning-based monocular depth estimation (MDE) model.

The storage 10 may include at least one type of a storage medium or memory of a flash memory type, a hard disk type, a micro type, a card type (e.g., a secure digital (SD) card, or an extreme digital (XD) card), or the like. The storage memory may include a random-access memory (RAM), a static RAM, a read-only memory (ROM), a programmable ROM (PROM), an erasable programmable ROM (EPROM), an electrically erasable PROM (EEPROM), a magnetic memory (MRAM), a magnetic disk, or an optical disk type memory.

The camera sensor 20, which is a module mounted on a vehicle to capture a monocular camera image, may include a front camera sensor, a rear camera sensor, a left camera sensor, and a right camera sensor.

The lidar sensor 30 may be mounted on a vehicle to generate a point cloud for an object around the vehicle. For example, as shown in FIGS. 2A and 2B, the lidar sensor 30 is mounted at a higher position than the camera sensor 20.

Figure 2A:
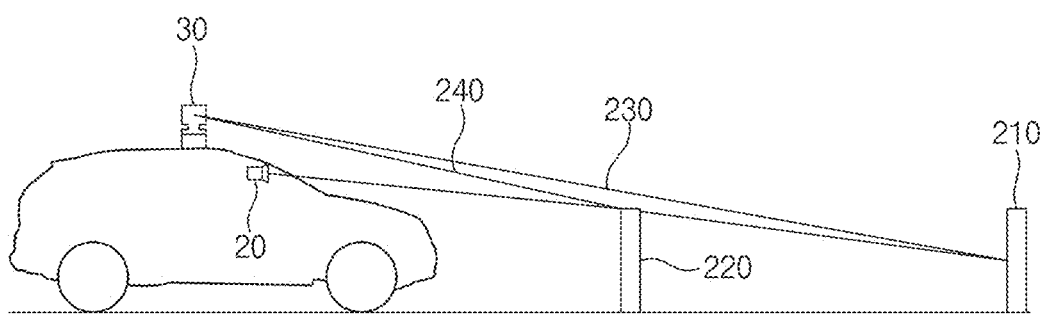
FIG. 2A is a diagram illustrating why pixels constituting one object in a monocular camera image have different depth information.

FIG. 2A is a diagram illustrating why pixels constituting one object in a monocular camera image have different depth information.

As shown in FIG. 2A, the lidar sensor 30 may be mounted at a higher position than the camera sensor 20 such that the 3D (X, Y, Z) point of an object 210 in which occlusion occurs from the viewpoint of the camera may be projected onto the monocular camera image. In other words, a phenomenon may occur in which the 3D point of a first object 220 and the 3D point of the second object 210 are simultaneously projected on one pixel in the monocular camera image. The lidar sensor 30 may detect the second object 210 through a first laser beam 230 and the first object 220 through a second laser beam 240.

Figure 2B:
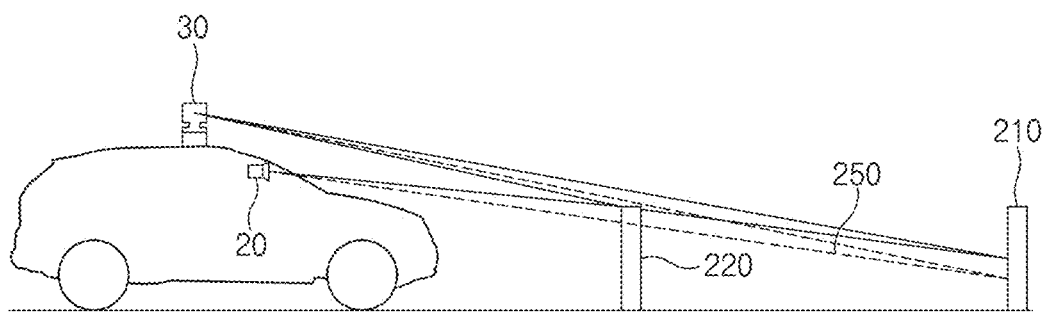
FIG. 2B is another diagram illustrating why pixels constituting one object in a monocular camera image have different depth information.

FIG. 2B is another diagram illustrating why pixels constituting one object in a monocular camera image have different depth information.

As shown in FIG. 2B, the lidar sensor 30 may be mounted at a higher position than the camera sensor 20 such that the 3D point of the object 210 in which occlusion occurs from the viewpoint of the camera may be projected onto the monocular camera image. In other words, a phenomenon may occur in which only the first object 220 is visible from the camera viewpoint, but the 3D point of the second object 210 is projected onto the monocular camera image. The lidar sensor 30 may detect the second object 210 which is invisible from the camera viewpoint through a third laser beam 250.

The controller 40 may perform overall control such that each component performs its function. The controller 40 may be implemented in the form of hardware or software or may be implemented in a combination of hardware and software. Preferably, the controller 40 may be implemented as a microprocessor, but is not limited thereto.

Specifically, the controller 40 may perform various controls in the processes of obtaining a monocular camera image from the camera sensor 20, obtaining a point cloud corresponding to the monocular camera image from the lidar sensor 30, removing noise from the point cloud, and generating a depth map of the monocular camera image based on the noise-removed point cloud.

In addition, the controller 40 may perform various controls in the processes of converting the point cloud of the lidar coordinate system into the point cloud of the camera coordinate system, maintaining only a point cloud that is actually visible from the camera viewpoint with respect to the point cloud of the camera coordinate system, and removing an actual invisible point cloud as noise. The controller 40 may remove an occlusion point from the point cloud of the camera coordinate system based on a convex hull algorithm.

In addition, the controller 40 may perform various controls in the processes of converting the noise-removed point cloud of the camera coordinate system into a point cloud of the image coordinate system and deleting, as noise, a point cloud corresponding to a specific region (e.g., a sky region or a lidar blind spot) in the monocular camera image from the point cloud of the image coordinate system. The controller 40 may detect a specific region (e.g., a sky region or a lidar blind spot) in the monocular camera image by using a deep learning-based segmentation model. The controller 40 may detect a lidar blind spot within the monocular camera image by using the deep learning-based MDE model.

Hereinafter, the operation of the controller 40 is described in detail with reference to FIGS. 3-7.

Figure 3:
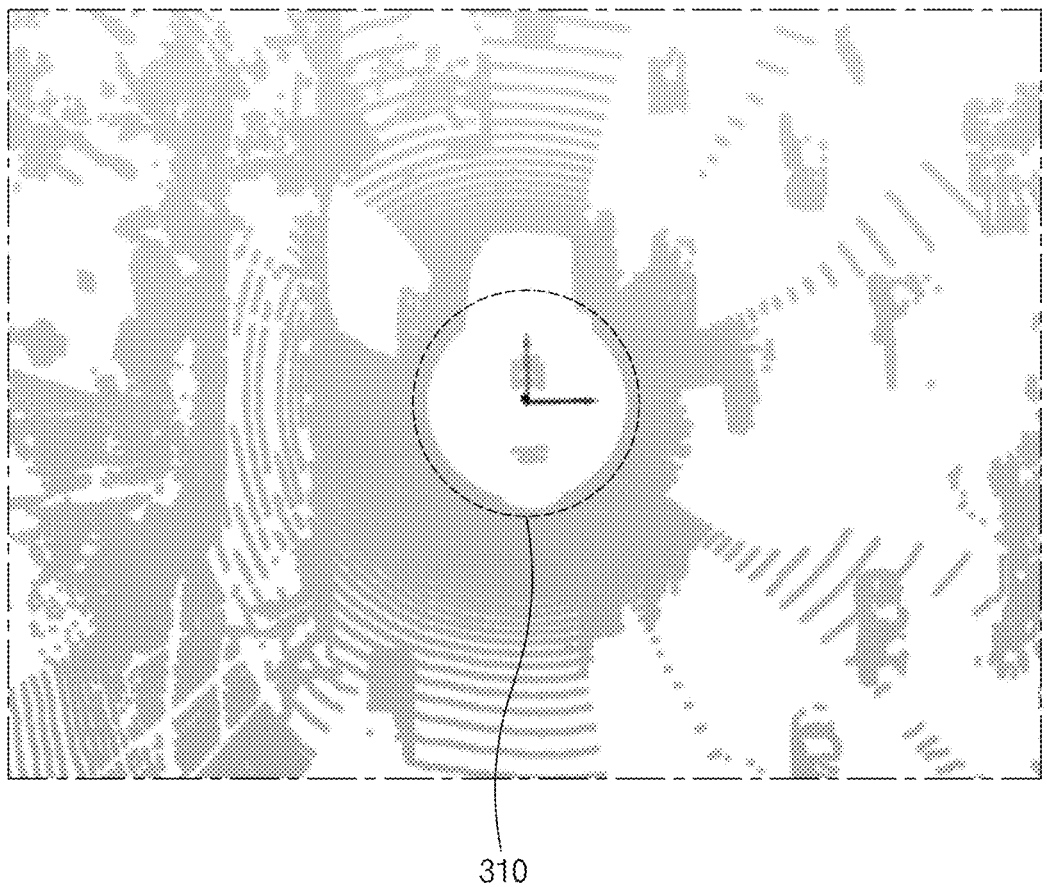
FIG. 3 is a diagram illustrating a point cloud generated by a light detection and ranging (lidar) sensor included in an apparatus for generating a depth map of a monocular camera image according to an embodiment of the present disclosure.

FIG. 3 is a diagram illustrating a point cloud generated by a lidar sensor included in an apparatus for generating a depth map of a monocular camera image according to an embodiment of the present disclosure.

As shown in FIG. 3, the lidar sensor 30 is positioned at the origin (0, 0, 0), and the position (3D coordinates) of each point is determined based on the origin. A 3D point is not formed in an adjacent region 310 of the vehicle due to the characteristics of the position at which the lidar sensor 30 is mounted. As a result, the lidar sensor 30 generates a point cloud of the lidar coordinate system.

The controller 40 may convert a point cloud of the lidar coordinate system into a point cloud of the camera coordinate system. For example, the controller 40 may convert a point cloud of the lidar coordinate system into a point cloud of the camera coordinate system based on following Equation 1.

$$\begin{bmatrix} X_c \\ Y_c \\ Z_c \end{bmatrix} = \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \quad \text{Equation 1}$$

In Equation 1, the left side represents the camera coordinate system, the first term on the right side represents a parameter, and the second term on the right side represents the lidar coordinate system.

The controller 40 may maintain only a point cloud that is visible from the camera viewpoint and may remove point clouds that are not visible as noise with respect to the point clouds of the camera coordinate system. In other words, the controller 40 may remove an occlusion point from the point cloud of the camera coordinate system based on, for example, a convex hull algorithm. As an example, a noise removal process of the controller 40 is described with reference to FIGS. 4A-5C.

Figure 4A:
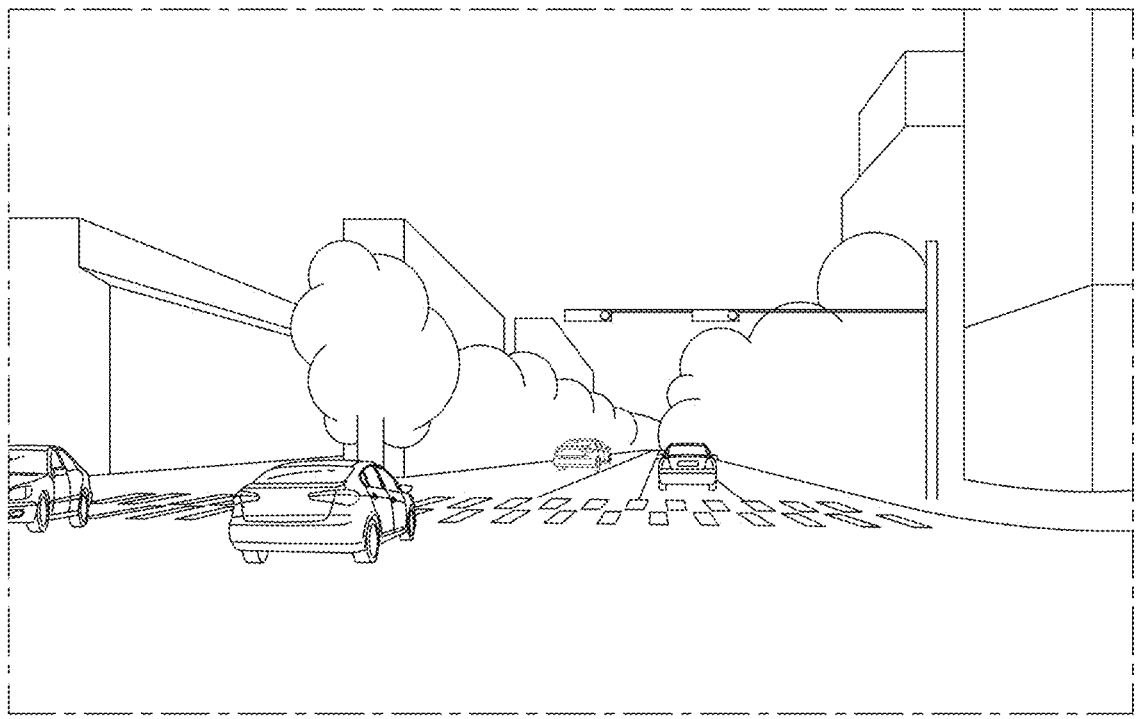
FIG. 4A is a diagram illustrating one example of a monocular camera image captured by a camera sensor included in an apparatus for generating a depth map of a monocular camera image according to an embodiment of the present disclosure.

FIG. 4A is a diagram illustrating one example of a monocular camera image captured by a camera sensor included in an apparatus for generating a depth map of a monocular camera image according to an embodiment of the present disclosure.

As shown in FIG. 4A, the monocular camera image, which is an image captured by a front camera mounted on a vehicle, includes vehicles driving at an intersection and includes buildings, trees, and roads located on the intersection.

Figure 4B:
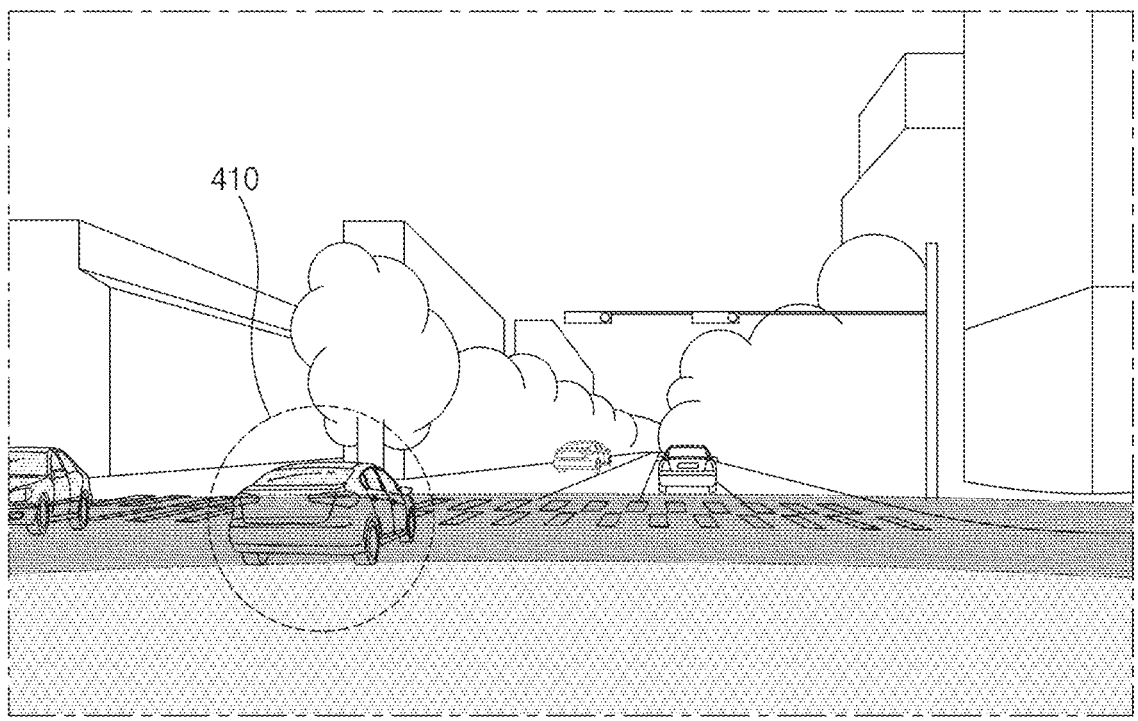
FIG. 4B is a diagram illustrating an example of a result of projecting a lidar point cloud onto a monocular camera image.

FIG. 4B is a diagram illustrating an example of a result of projecting a lidar point cloud onto a monocular camera image. For better understanding, point clouds for all objects are not shown and only point clouds for some objects (e.g., a nearby road or a nearby vehicle) are shown.

Because the lidar sensor 30 is mounted at a higher position than the camera sensor 20 as shown in FIG. 2B, it may be understood that the 3D point of an object in which an occlusion occurs in the camera viewpoint as shown in FIG. 4B is projected onto the monocular camera image. In other words, it may be understood that the pixels constituting a vehicle in the monocular camera image have different depth information (410). Different shades represent different depth information.

Figure 4C:
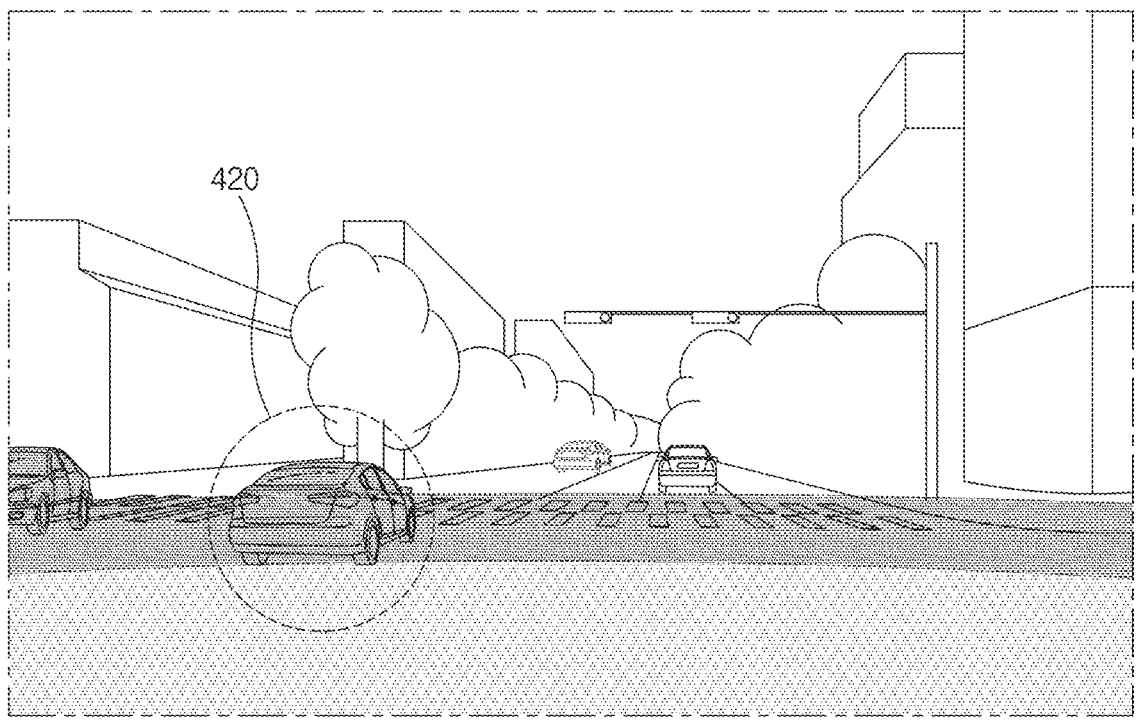
FIG. 4C is a diagram illustrating an example of a result of removing noise by a controller provided in an apparatus for generating a depth map of a monocular camera image according to an embodiment of the present disclosure.

FIG. 4C is a diagram illustrating one example of a result of removing noise by a controller provided in an apparatus for generating a depth map of a monocular camera image according to an embodiment of the present disclosure.

As shown in FIG. 4C, the controller 40 removes an occlusion point from the point cloud of the vehicle based on a convex hull algorithm, so that the vehicle has the same depth information (420).

Figure 5A:
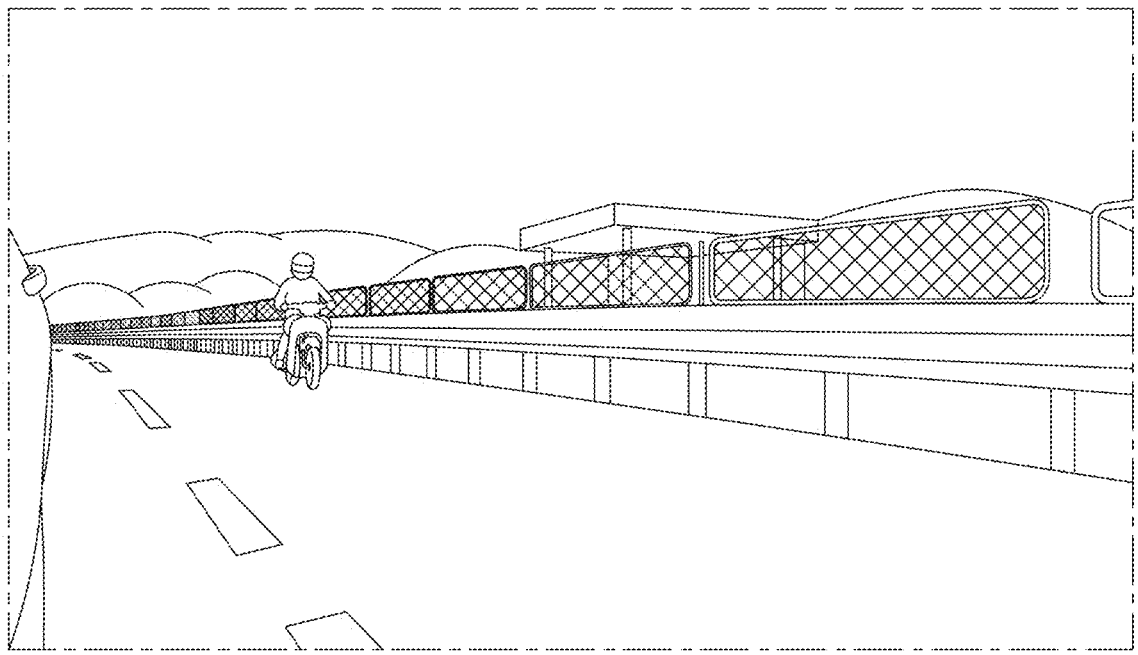
FIG. 5A is a diagram illustrating another example of a monocular camera image captured by a camera sensor included in an apparatus for generating a depth map of a monocular camera image according to an embodiment of the present disclosure.

FIG. 5A is a diagram illustrating another example of a monocular camera image captured by a camera sensor included in an apparatus for generating a depth map of a monocular camera image according to an embodiment of the present disclosure.

As shown in FIG. 5A, the monocular camera image, which is an image captured by a rear camera mounted on a vehicle, includes a motorcycle driving on a road and a guardrail located on the road.

Figure 5B:
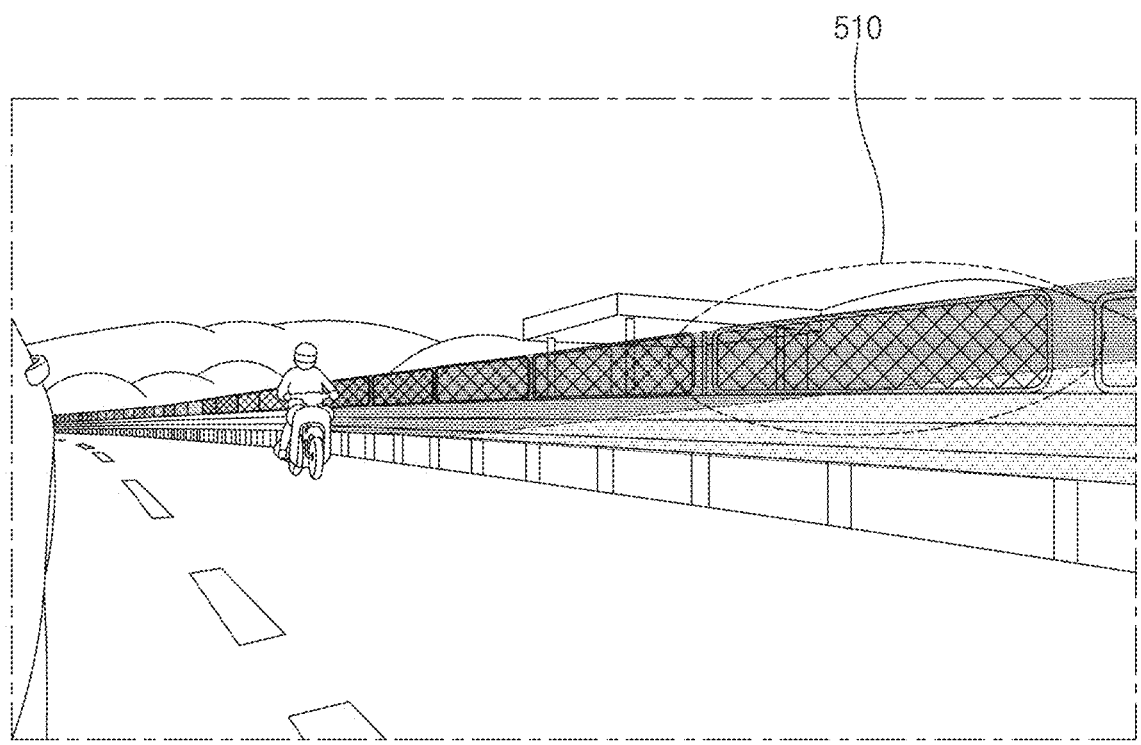
FIG. 5B is a diagram illustrating another example of a result of projecting a lidar point cloud onto a monocular camera image.

FIG. 5B is a diagram illustrating another example of a result of projecting a lidar point cloud onto a monocular camera image. For better understanding, point clouds for all objects are not shown and instead only point clouds for some objects (e.g., a proximity guardrail) are shown.

Because the lidar sensor 30 is mounted at a higher position than the camera sensor 20 as shown in FIG. 2B, it may be understood that the 3D point of an object in which an occlusion occurs in the camera viewpoint as shown in FIG. 5B is projected onto the monocular camera image. In other words, it may be understood that the pixels constituting the guardrail in the monocular camera image have different depth information (510). Different shades represent different depth information.

Figure 5C:
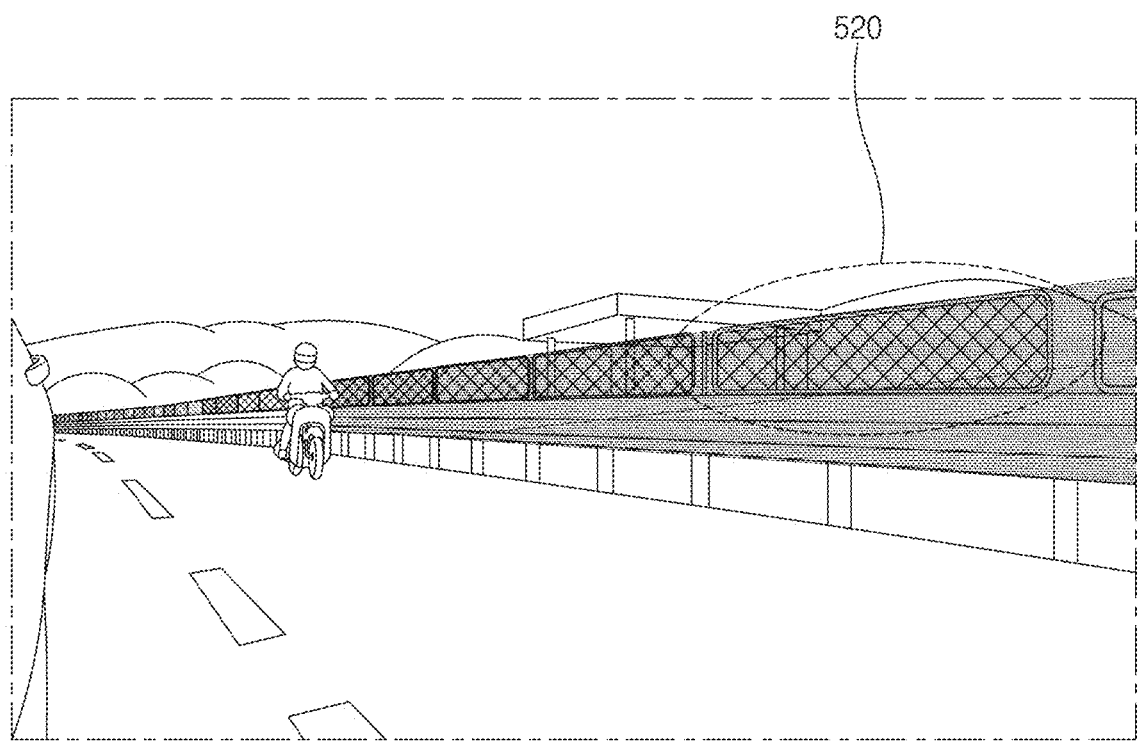
FIG. 5C is a diagram illustrating another example of a result of removing noise by a controller provided in an apparatus for generating a depth map of a monocular camera image according to an embodiment of the present disclosure.

FIG. 5C is a diagram illustrating another example of a result of removing noise by a controller provided in an apparatus for generating a depth map of a monocular camera image according to an embodiment of the present disclosure.

As shown in FIG. 5C, the controller 40 removes an occlusion point from the point cloud of the guardrail based on a convex hull algorithm, so that the guardrail has the same depth information (520).

The controller 40 may convert a point cloud of the camera coordinate system from which noise is removed into a point cloud of the image coordinate system. For example, the controller 40 may convert the noise-removed point cloud of the camera coordinate system into a point cloud of the image coordinate system based on following Equation 2 and Equation 3.

$$x' = \frac{X_c}{Z_c},$$ Equation 2

$$y' = \frac{Y_c}{Z_c}$$

In Equation 2, (x'', y') represents a normalized image coordinate system (normalized image plane) and ($X_c$, $Y_c$, $Z_c$) represents a camera coordinate system.

$$\begin{bmatrix} u \\ v \\ 1 \end{bmatrix} = \begin{bmatrix} f_x & 0 & O_x \\ 0 & f_y & O_y \\ 0 & 0 & 1 \end{bmatrix} \begin{bmatrix} x' \\ y' \\ 1 \end{bmatrix}$$ Equation 3

In Equation 3, the left side represents an image coordinate system (image plane), the first term on the right side represents a parameter, and the second term on the right side represents a normalized image coordinate system.

In the end, when Equation 1, Equation 2, and Equation 3 are integrated, it may be expressed as following Equation 4.

$$\begin{bmatrix} u \\ v \\ 1 \end{bmatrix} = \frac{1}{Z_c} \begin{bmatrix} f_x & 0 & O_x \\ 0 & f_y & O_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix}$$ Equation 4

In Equation 4, $Z_c = r_{31}X + r_{32}Y + r_{33}Z + t_3$ is satisfied.

Figure 6:
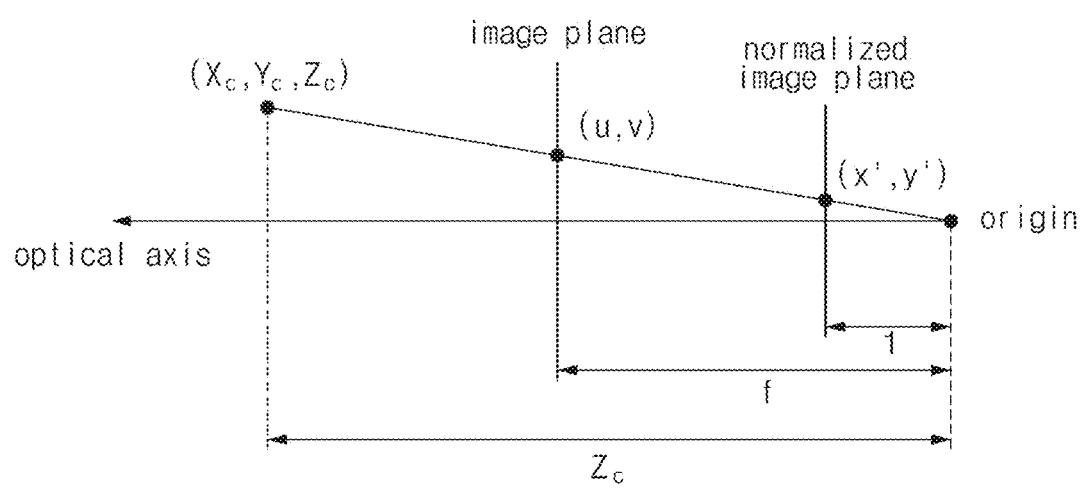
FIG. 6 is a diagram illustrating a principle of converting a point cloud of a camera coordinate system to a point cloud of an image coordinate system.

FIG. 6 is a diagram illustrating a principle of converting a point cloud of a camera coordinate system to a point cloud of an image coordinate system.

As shown in FIG. 6, a coordinate system on a plane having a distance of '1' from the origin in the direction of an optical axis is referred to as a normalized image coordinate system. A coordinate system on a plane having a distance of 'f' from the origin in the direction of the optical axis is referred to as an image coordinate system. A coordinate system having a distance of $Z_c$ from the origin in the direction of the optical axis is referred to as a camera coordinate system. This relationship is expressed as Equation 3.

The controller 40 may delete the point cloud corresponding to a specific region (e.g., a sky region or a lidar blind spot) in the monocular camera image from the point clouds of the image coordinate system as noise.

For example, the controller 40 may detect a sky region from a monocular camera image by using a deep learning-based segmentation model and may delete the point cloud corresponding to the sky region.

As another example, the controller 40 may detect a lidar blind spot in a monocular camera image by using a deep learning-based MDE model and delete the point cloud corresponding to the lidar blind spot. In other words, the controller 40 may estimate the depth map of the monocular camera image based on the MDE model. The controller may also delete the point cloud of the image coordinate system of which the difference between the estimated depth map (depth value) and the point cloud (depth value) of the image coordinate system exceeds a threshold value.

Figure 7:
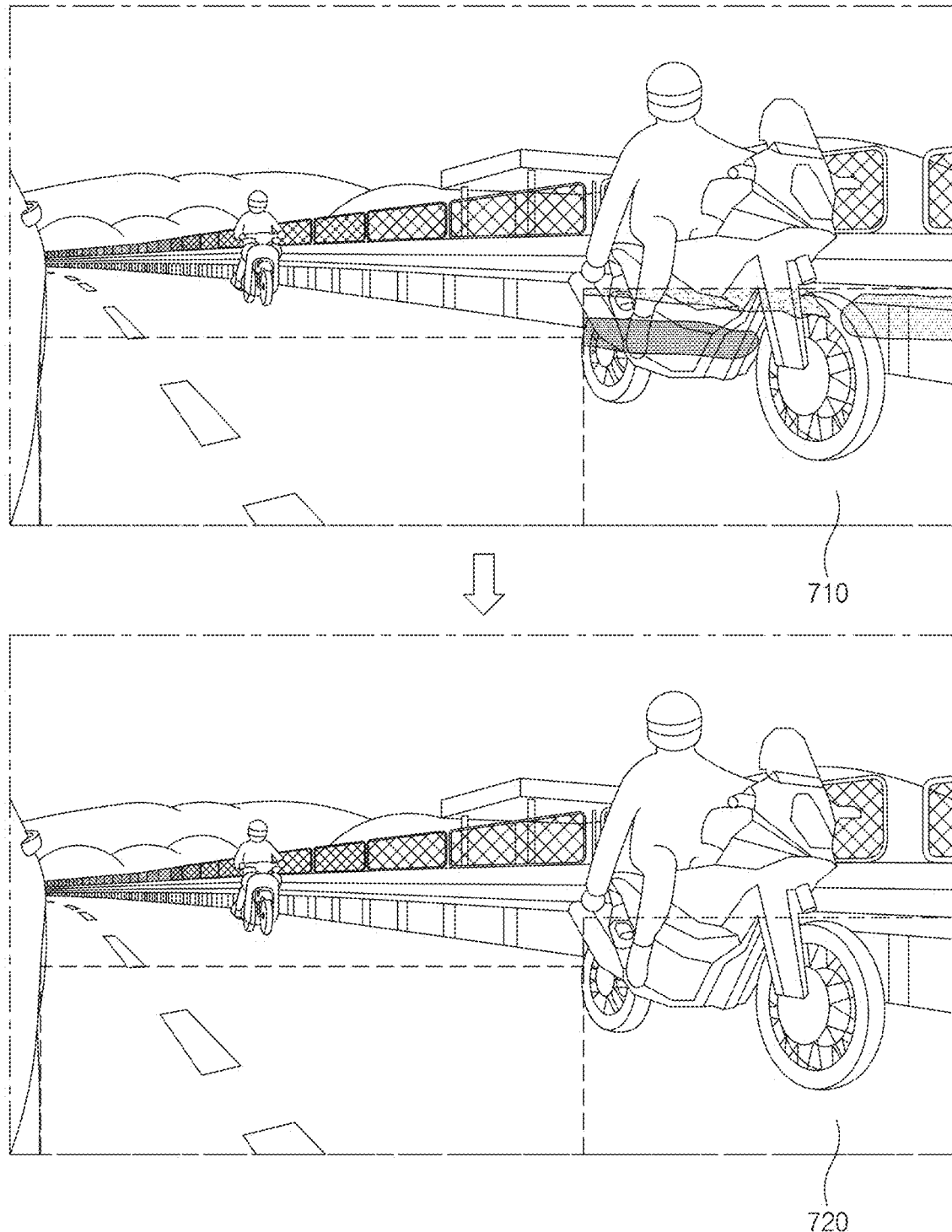
FIG. 7 is a diagram illustrating a process of deleting a point cloud of a lidar blind spot by a controller provided in an apparatus for generating a depth map of a monocular camera image according to an embodiment of the present disclosure.

FIG. 7 is a diagram illustrating a process of deleting a point cloud of a lidar blind spot by a controller provided in an apparatus for generating a depth map of a monocular camera image according to an embodiment of the present disclosure. For better understanding, point clouds for all objects are not shown and only point clouds within the lidar blind spot are shown.

As shown in FIG. 7, it may be understood that a point cloud is included in a lidar blind spot 710 in a monocular camera image. Because any point clouds cannot exist in the lidar blind spot 710, the controller 40 deletes the point cloud in the lidar blind spot as denoted by reference numeral 720.

The depth map of the monocular camera image thus generated may be utilized as learning data for training a MDE model.

Figure 8:
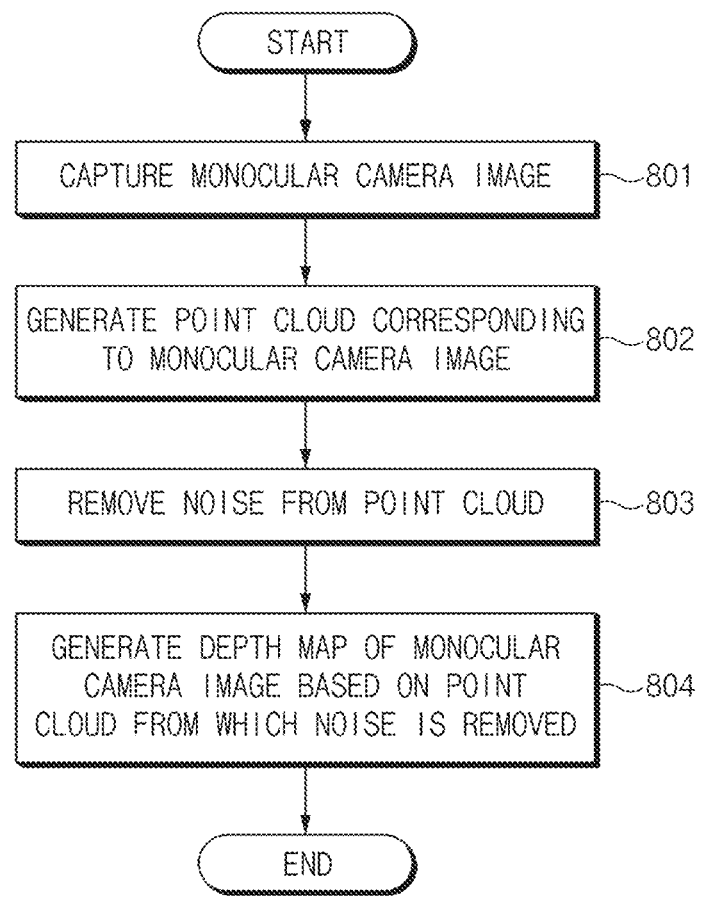
FIG. 8 is a flowchart illustrating a method of generating a depth map of a monocular camera image according to an embodiment of the present disclosure.

FIG. 8 is a flowchart illustrating a method of generating a depth map of a monocular camera image according to an embodiment of the present disclosure.

First, the camera sensor 20 captures a monocular camera image in step 801.

Then, the lidar sensor 30 generates a point cloud corresponding to the monocular camera image in step 802.

Then, the controller 40 removes noise from the point cloud in step 803.

Then, the controller 40 generates the depth map of the monocular camera image based on the point cloud from which noise is removed in step 804.

Figure 9:
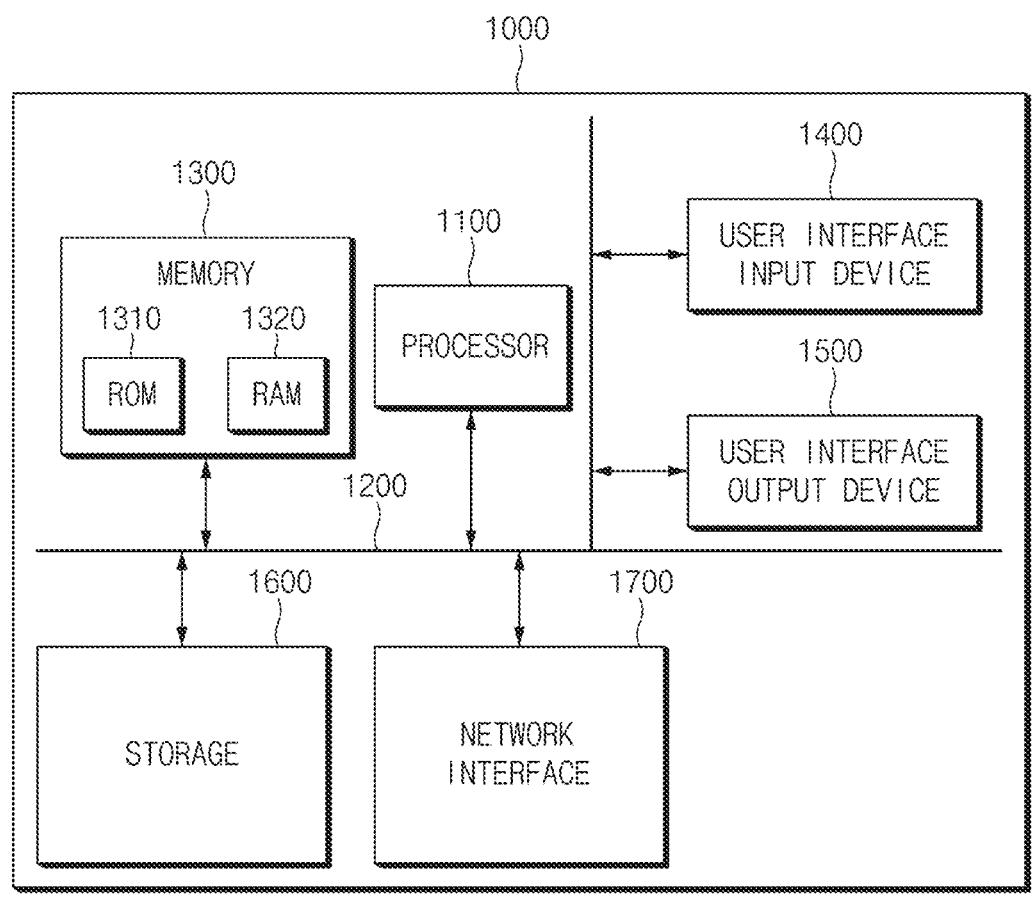
FIG. 9 is a block diagram illustrating a computing system for executing a method of generating a depth map of a monocular camera image according to an embodiment of the present disclosure.

FIG. 9 is a block diagram illustrating a computing system for executing a method of generating a depth map of a monocular camera image according to an embodiment of the present disclosure.

Referring to FIG. 9, as described above, a method of generating a depth map of a monocular camera image according to an embodiment of the present disclosure may be implemented through a computing system. A computing system 1000 may include at least one processor 1100 connected through a system bus 1200, a memory 1300, a user interface input device 1400, a user interface output device 1500, storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read-only memory (ROM) 1310 and a random access memory (RAM) 1320.

Accordingly, the processes of the method or algorithm described in relation to the embodiments of the present disclosure may be implemented directly by hardware executed by the processor 1100, a software module, or a combination thereof. The software module may reside in a storage medium (i.e., the memory 1300 and/or the storage 1600), such as a RAM, a flash memory, a ROM, a PROM, an EPROM, an EEPROM, a register, a hard disk, a detachable disk, or a compact-disk ROM (CD-ROM). The storage medium may be coupled to the processor 1100 and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor and the storage medium may reside in the user terminal as an individual component.

According to the embodiments of the present disclosure, the apparatus and method for generating a depth map of a monocular camera image may construct a learning database (DB) capable of improving the performance of a MDE model. The apparatus and method may do so by obtaining a monocular camera image from a camera sensor, obtaining a point cloud corresponding to the monocular camera image from a lidar sensor, removing noise from the point cloud, and generating a depth map of the monocular camera image based on the noise-removed point cloud.

The above description is a simple exemplification of the technical spirit of the present disclosure. The embodiments of the present disclosure may be variously changed and modified by those having ordinary skill in the art to which the present disclosure pertains without departing from the essential features of the present disclosure. Therefore, the disclosed embodiments of the present disclosure do not limit the technical spirit of the present disclosure but are illustrative thereof, and the scope of the technical spirit of the present disclosure is not limited by the embodiments of the present disclosure. The scope of the present disclosure should be construed by the claims, and it should be understood that all the technical spirits within the equivalent range fall within the scope of the present disclosure.

What is claimed is:

1. An apparatus for generating a depth map of a monocular camera image, the apparatus comprising:
   a camera sensor configured to photograph the monocular camera image;
   a light detection and ranging (lidar) sensor configured to generate a point cloud corresponding to the monocular camera image; and
   a controller configured to remove noise from the point cloud and generate the depth map of the monocular camera image based on the point cloud from which the noise is removed.

2. The apparatus of claim 1, wherein the controller is configured to convert a point cloud of a lidar coordinate system into a point cloud of a camera coordinate system.

3. The apparatus of claim 2, wherein the controller is configured to maintain a point cloud that is visible from a camera viewpoint and to remove a point cloud that is not visible from the camera viewpoint with respect to the point cloud of the camera coordinate system.

4. The apparatus of claim 2, wherein the controller is configured to remove an occlusion point from the point cloud of the camera coordinate system based on a convex hull algorithm.

5. The apparatus of claim 3, wherein the controller is configured to convert the noise-removed point cloud of the camera coordinate system into a point cloud of an image coordinate system.

6. The apparatus of claim 5, wherein the controller is configured to delete a point cloud corresponding to a specific region within the monocular camera image from the point cloud of the image coordinate system.

7. The apparatus of claim 6, wherein the controller is configured to detect the specific region in the monocular camera image by using a deep learning-based segmentation model.

8. The apparatus of claim 6, wherein the specific region includes at least one of a sky region and a lidar blind spot.

9. A method of generating a depth map of a monocular camera image, the method comprising:
   photographing, by a camera sensor, the monocular camera image;
   generating, by a light detection and ranging (lidar) sensor, a point cloud corresponding to the monocular camera image;
   removing, by a controller, noise from the point cloud; and
   generating, by the controller, the depth map of the monocular camera image based on the point cloud from which the noise is removed.

10. The method of claim 9, wherein removing the noise includes converting, by the controller, a point cloud of a lidar coordinate system into a point cloud of a camera coordinate system.

11. The method of claim 10, wherein removing the noise includes:
    maintaining, by the controller, a point cloud that is actually visible from a camera viewpoint with respect to the point cloud of the camera coordinate system; and
    removing, by the controller, a point cloud that is not actually visible from the camera viewpoint.

12. The method of claim 10, wherein removing the noise includes removing, by the controller, an occlusion point from the point cloud of the camera coordinate system based on a convex hull algorithm.

13. The method of claim 11, wherein removing the noise includes converting, by the controller, the noise-removed point cloud of the camera coordinate system into a point cloud of an image coordinate system.

14. The method of claim 13, wherein removing the noise includes deleting, by the controller, a point cloud corresponding to a specific region within the monocular camera image from the point cloud of the image coordinate system.

15. The method of claim 14, wherein deleting the point cloud includes detecting, by the controller, the specific region in the monocular camera image by using a deep learning-based segmentation model.

16. The method of claim 14, wherein the specific region includes at least one of a sky region and a lidar blind spot.

* * * * *